(12) United States Patent
Fukawa et al.

(10) Patent No.: US 7,085,102 B2
(45) Date of Patent: Aug. 1, 2006

(54) TAPE CASSETTE

(75) Inventors: Tsuguo Fukawa, Tomobe-machi (JP); Kazuhiko Suzuki, Ibaraki-machi (JP); Jin Kurata, Mito (JP)

(73) Assignee: Victor Company of Japan, Ltd., Yokohama (JP)

( * ) Notice: Subject to any disclaimer, the term of this patent is extended or adjusted under 35 U.S.C. 154(b) by 648 days.

(21) Appl. No.: 09/944,103

(22) Filed: Sep. 4, 2001

(65) Prior Publication Data

US 2002/0027745 A1 Mar. 7, 2002

(30) Foreign Application Priority Data

Sep. 1, 2000 (JP) .............................. 2000-265246
Dec. 28, 2000 (JP) .............................. 2000-400666

(51) Int. Cl.
*G11B 23/02* (2006.01)
(52) U.S. Cl. ..................................... 360/132
(58) Field of Classification Search .............. 360/74.5, 360/132, 74.6; 242/344
See application file for complete search history.

(56) References Cited

U.S. PATENT DOCUMENTS

| | | | | | |
|---|---|---|---|---|---|
| 4,343,024 | A | * | 8/1982 | Kawai | 360/74.6 |
| 4,862,305 | A | * | 8/1989 | Katagiri et al. | 360/132 |
| 4,993,661 | A | * | 2/1991 | Tollefson | 242/344 |
| 5,057,961 | A | * | 10/1991 | Rayis | 360/137 |
| 5,121,275 | A | * | 6/1992 | Komiyama | 360/132 |
| 6,587,306 | B1 | * | 7/2003 | Ishikawa et al. | 360/132 |

FOREIGN PATENT DOCUMENTS

| | | |
|---|---|---|
| JP | 60-236177 | 11/1985 |
| JP | 63-249991 | 10/1988 |
| JP | 4-53078 | 9/1992 |

* cited by examiner

*Primary Examiner*—Tianjie Chen
(74) *Attorney, Agent, or Firm*—Connolly Bove Lodge & Hutz LLP

(57) ABSTRACT

An upper half 11 of a tape cassette BB is made by at least a material having high transparency. Right and left holes 18a and 18b for light path are formed on side surfaces of the upper half 11. Further, roughened surfaces 10a and 10b in a prismatic shape are formed on outer right and left sides 11A1 and 11B1 or inner right and left sides 11A2 and 11B2 of the upper half 11 in neighboring areas of or adjacent to the right and left holes 18a and 18b.

1 Claim, 13 Drawing Sheets

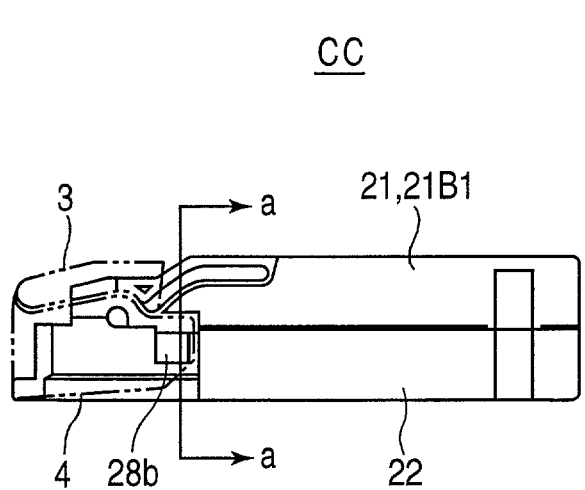
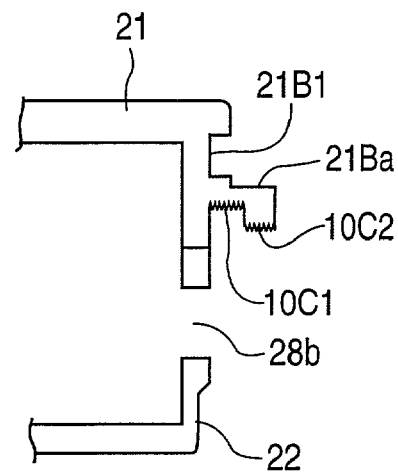
*Fig. 13(a)*        *Fig. 13(b)*
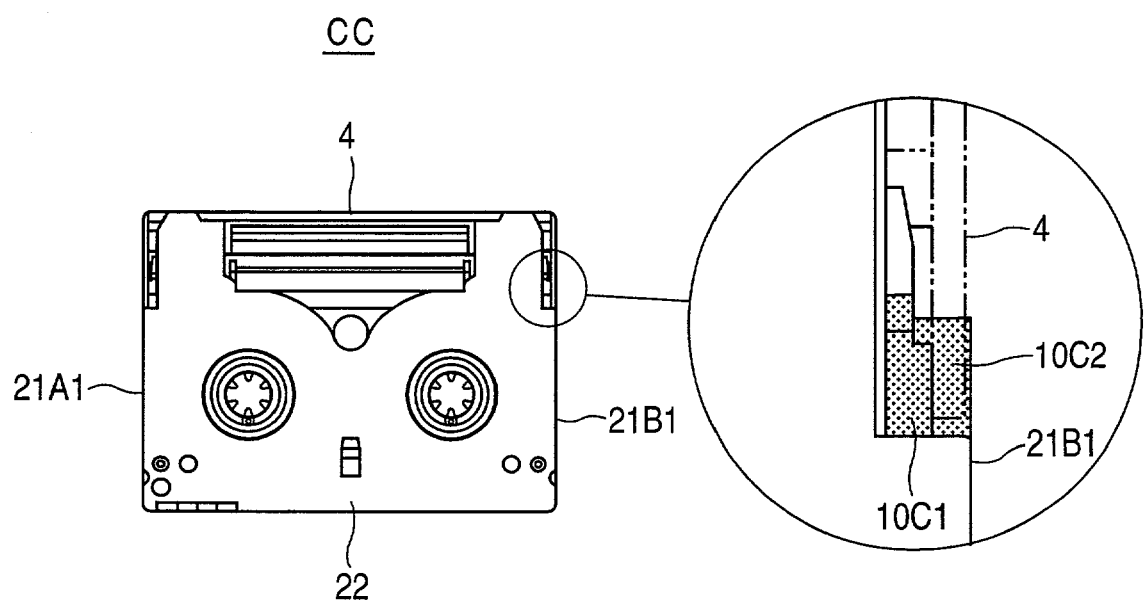
*Fig. 14*

TAPE CASSETTE

BACKGROUND OF THE INVENTION

1. Field of the Invention

The present invention relates to a tape cassette, which is formed by a material of higher transparency in order to detect an end of a magnetic tape by detection light from a light source for detecting an end of tape inserted into a cassette half.

2. Description of the Related Art

FIG. 1 is a plan view of a conventional tape cassette according to the prior art.

FIG. 2 is a perspective view of the conventional tape cassette shown in FIG. 1.

FIG. 3 is a fragmentary cross-sectional view of the conventional tape cassette shown in FIG. 1 for explaining a light path between a light emitting element and a light receiving element inside the tape cassette.

FIG. 4 is a side elevation view in cross section of the conventional tape cassette for explaining the light path between the light emitting element and the light receiving element shown in FIG. 3.

FIG. 5 is a side view of the conventional tape cassette shown in FIG. 1.

FIG. 6 is a partially enlarged side view of the conventional tape cassette shown in FIG. 1.

FIG. 7 is a side elevation view partially enlarged in cross section of the conventional tape cassette for exhibiting a state of scattered light beam reaching to the light receiving element as an undesired light beam in the cassette half.

In FIGS. 1 through 7, a tape cassette AA is composed of an upper half 1, a lower half 2, a top lid 3, a front lid 4, a window 5, two upper flanges 6a and 6b, two lower flanges 7a and 7b, right and left holes 8a and 8b for light path, two hubs 9a and 9b, and a magnetic tape T. The upper half 1 is further composed of an outer right side 1A1, an outer left side 1B1, an inner right side 1A2, and an inner left side 1B2. The upper flange 6a is formed with a top surface 6a1 and a bottom surface 6a2 and the other upper flange 6b is formed with a top surface 6b1 and a bottom surface 6b2. Furthermore, in FIGS. 3, 4, and 7, "D1" is a light emitting element, each of "D2" and "D3" is a light receiving element, and each of "L1" and "L2" is a detection light beam detected by respective light receiving elements D2 and D3, wherein the detection light beams L1 and L2 are generically referred to a light path L. Moreover, in FIG. 1, symbols A and A' represent neighboring areas of the right and left holes 8a and 8b respectively.

A tape end is detected by detecting a light beam irradiated from a light source for detecting a tape end by receiving more than a predetermined luminous energy of the light beam, wherein the light source is inserted into a tape cassette. The tape cassette AA having a configuration of detecting both ends of the long magnetic tape T, which is wound around the both hubs 9a and 9b with contacting along the upper and lower flanges 6a, 7a, 6b, and 7b, is organized so as to form the light path L such that a light beam irradiated from the light emitting element D1, which is mounted on a video tape recorder (hereinafter referred to a VTR), not shown, as a light source, reaches the light receiving elements D2 and D3.

Generally, in the tape cassette AA shown in FIGS. 1 and 2 being constructed by a material having high light shielding ability such as black, if there existed the magnetic tape T in the light path L as shown in FIGS. 3 and 4, the light beams L1 and L2 irradiated from the light emitting element D1 are shielded by the magnetic tape T. Accordingly, the light receiving elements D2 and D3 become an extremely low luminous energy receiving condition, that is, the light receiving elements D2 and D3 can hardly receive the light beams L1 and L2.

A leader tape section (not shown) not coated with magnetic powder is provided at both ends of the magnetic tape T rolled up inside the tape cassette AA. These leader tape sections are formed by a material being pervious to a light beam irradiated from the light emitting element D1.

Therefore, while the magnetic tape T is running after the tape cassette AA has been loaded into a VTR, luminous energy received by the light receiving elements D2 and D3 of the light beam irradiated from the light emitting element D1 changes rapidly from low to high as much as exceeding the predetermined luminous energy at a time when the magnetic tape T shifts from a magnetic tape section coated with magnetic powder over to the leader tape section. Accordingly, the end of the magnetic tape T can be detected.

In FIGS. 4 and 5, a roughening treatment is not applied on upper surfaces of the right and left holes 8a and 8b for the light path, which are provided by combining the upper and lower halves 1 and 2 with each other, that is, the outer right and left sides 1A1 and 1B1 are not roughened, although the upper half 1 is formed by a material of high transparency and the lower half 2 is formed by a black material without transparency.

An external light beam, which entered into the tape cassette AA through the upper half 1, passes through an inside of the tape cassette AA and gets out from the tape cassette AA through the upper half 1 once again. A part of the light beam getting out through the upper half 1 passes through the upper half 1 from the inner right and left sides 1A2 and 1B2 to the outer right and left sides 1A1 and 1B1. In a case that the external light beam passed through the upper surfaces of the right and left holes 8a and 8b, that is, through the upper half 1 from the inner right and left sides 1A2 and 1B2 to the outer right and left sides 1A1 and 1B1 gets into the light receiving elements D2 and D3, the light receiving elements D2 and D3 detect light reception if the luminous energy of the external light beam gotten into the light receiving elements D2 and D3 exceeds the predetermined luminous energy, even though the detection light beams L1 and L2 irradiated from the light emitting element D1 do not reach to the light receiving elements D2 and D3.

Thus, the VTR accidentally determines that the magnetic tape T has come to its end although the magnetic tape T is not in the terminal position of the tape. Accordingly, the VTR may stop functioning while the magnetic tape T is still running.

As mentioned above, in a case that at least the upper half 1 out of both upper and lower halves 1 and 2 constituting the tape cassette AA is formed by a material of high transparency or a semitransparent material, an external light beam such as sunlight may enter into the tape cassette AA through the upper half 1. The external light beam entered into the tape cassette AA reaches to the light detecting elements D2 and D3 provided on the VTR as transmission light or scattered light, that is, undesired light other than the detection light beams L1 and L2 through the upper surfaces of the right and left holes 8a and 8b, that is, through the upper half 1 from the inner right and left sides 1A2 and 1B2 to the outer right and left sides 1A1 and 1B1 even when the magnetic tape T is running in the VTR. The light detecting elements D2 and D3 detect light reception if luminous energy of the external light beam exceeds a detectable level of the light receiving elements D2 and D3. Thus, the VTR accidentally determines that the magnetic tape T has come to its end although the magnetic tape T is not in the terminal position of the tape. Accordingly, the VTR may stop functioning while the magnetic tape T is still running.

Further, the light emitting element D1 as the light source for detecting a terminal position of a tape always irradiates a light beam during a period of time until the tape cassette AA is ejected after the tape cassette AA has been loaded into the VTR. Furthermore, a light irradiating position of the light emitting element D1 is arranged at a predetermined angle with respect to allocations of the light receiving elements D2 and D3. Accordingly, a light beam irradiated from the light emitting element D1 is split into direct light, which directly reaches to the light receiving elements D2 and D3 through the right and left holes 8a and 8b for the light path, and scattered light, which reaches to the light receiving elements D2 and D3 through the upper half 1 in vicinities of the right and left holes 8a and 8b after the light beam irradiated from the light emitting element D1 has been scattered inside the tape cassette AA.

Then, the light receiving elements D2 and D3 detect light reception if the luminous energy of the scattered light exceeds the detectable level of the light receiving elements D2 and D3. Thus, the VTR accidentally determines that the magnetic tape T has come to its end although the magnetic tape T is not in the terminal position of the tape. Accordingly, the VTR may stop functioning while the magnetic tape T is still running.

SUMMARY OF THE INVENTION

Accordingly, in consideration of the above-mentioned problems of the prior art, an object of the present invention is to provide a tape cassette, which can prevent an accidental detection of tape end of a magnetic tape in a VTR by preventing undesired light other than detection light having luminous energy exceeding a detectable level for light reception, wherein the tape cassette is formed with a hole for light path provided at confronting surfaces between a side of an upper half having high optical transparency and a side of lower half so as to pass detection light from a light emitting section of the VTR to a light receiving section of the VTR and further an outer side surface of the upper half and/or an outer side surface of the lower half adjacent to the hole for light path is roughened.

In order to achieve the above object, the present invention provides a tape cassette comprising an upper half and a lower half combined with each other, being utilized for an apparatus, which is provided with a light emitting section for detecting a tape end of a magnetic tape and a light receiving section for detecting the tape end of the magnetic tape by receiving a detection light beam irradiated by the light emitting section and detects a tape end such that the detection light beam irradiated by the light emitting section reaches to the light receiving section in a level of luminous energy more than a predetermined luminous energy level, wherein a light path of the detection light beam crosses the magnetic tape installed in the tape cassette, the tape cassette is further characterized in that at least the upper half is made by a material having high optical transparency, and that a hole for light path is formed on a side surface of the upper and lower halves so as to pass the detection light beam irradiated by the light emitting section to the light receiving section, and that undesired light other than the detection light beam in the predetermined luminous energy level is prevented from reaching to the light receiving section by roughening an outer side surface of the upper half adjacent to the hole for light path and/or an outer side surface of the lower half.

According to another aspect of the present invention, there provided a tape cassette comprising an upper half and a lower half combined with each other, being utilized for an apparatus, which is provided with a light emitting section for detecting a tape end of a magnetic tape and a light receiving section for detecting the tape end of the magnetic tape by receiving a detection light beam irradiated by the light emitting section and detects a tape end such that the detection light beam irradiated by the light emitting section reaches to the light receiving section in a level of luminous energy more than a predetermined luminous energy level, wherein a light path of the detection light beam crosses the magnetic tape installed in the tape cassette, the tape cassette is further characterized in that the upper half is made by a material having higher optical transparency and the lower half is made by a material having lower optical transparency, and that undesired light other than the detection light beam in the predetermined luminous energy level is prevented from reaching to the light receiving section by forming a hole for light path only on a side surface of the lower half for passing the detection light beam irradiated by the light emitting section to the light receiving section.

According to further aspect of the present invention, there provided a tape cassette comprising an upper half and a lower half combined with each other, being utilized for an apparatus, which is provided with a light emitting section for detecting a tape end of a magnetic tape and a light receiving section for detecting the tape end of the magnetic tape by receiving a detection light beam irradiated by the light emitting section and detects a tape end such that the detection light beam irradiated by the light emitting section reaches to the light receiving section in a level of luminous energy more than a predetermined luminous energy level, wherein a light path of the detection light beam crosses the magnetic tape installed in the tape cassette, the tape cassette is further characterized in that at least the upper half is made by a material having high optical transparency, and that a hole for light path is formed on a side surface of the upper and lower halves so as to pass the detection light beam irradiated by the light emitting section to the light receiving section, and that undesired light other than the detection light beam in the predetermined luminous energy level is prevented from reaching to the light receiving section by roughening an inner side surface of the upper half adjacent to the hole for light path and/or an inner side surface of the lower half.

Other object and further features of the present invention will be apparent from the following detailed description when read in conjunction with the accompanying drawings.

BRIEF DESCRIPTION OF DRAWINGS

FIG. 13(a) is a left side view of a tape cassette according to a second embodiment of the present invention.

FIG. 13(b) is a cross sectional view taken substantially along line a—a of FIG. 13(a).

FIG. 14 is a bottom end view of the tape cassette according to the second embodiment of the present invention.

DETAILED DESCRIPTION OF THE PREFERRED EMBODIMENTS

Prior to describing details of the preferred embodiments, a configuration and constitution of a tape cassette, which is common to all the preferred embodiments of the present invention, is depicted first.

Figure 1:
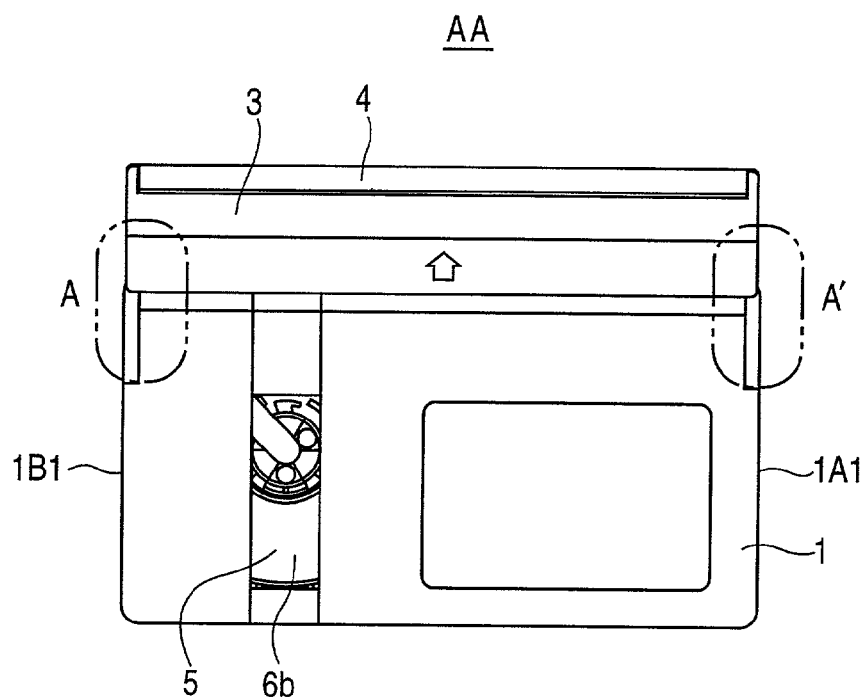
FIG. 1 is a plan view of a conventional tape cassette according to the prior art.
Figure 2:
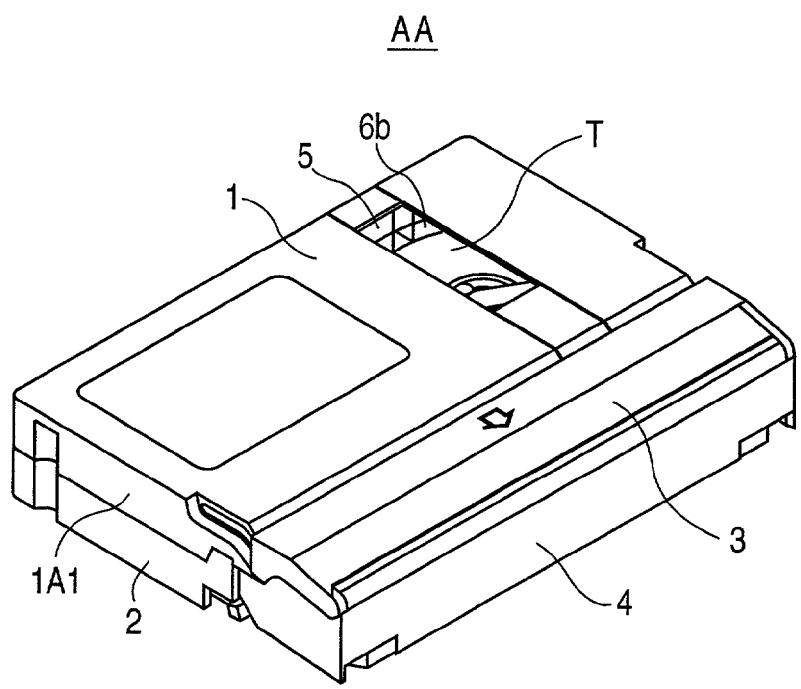
FIG. 2 is a perspective view of the conventional tape cassette shown in FIG. 1.
Figure 3:
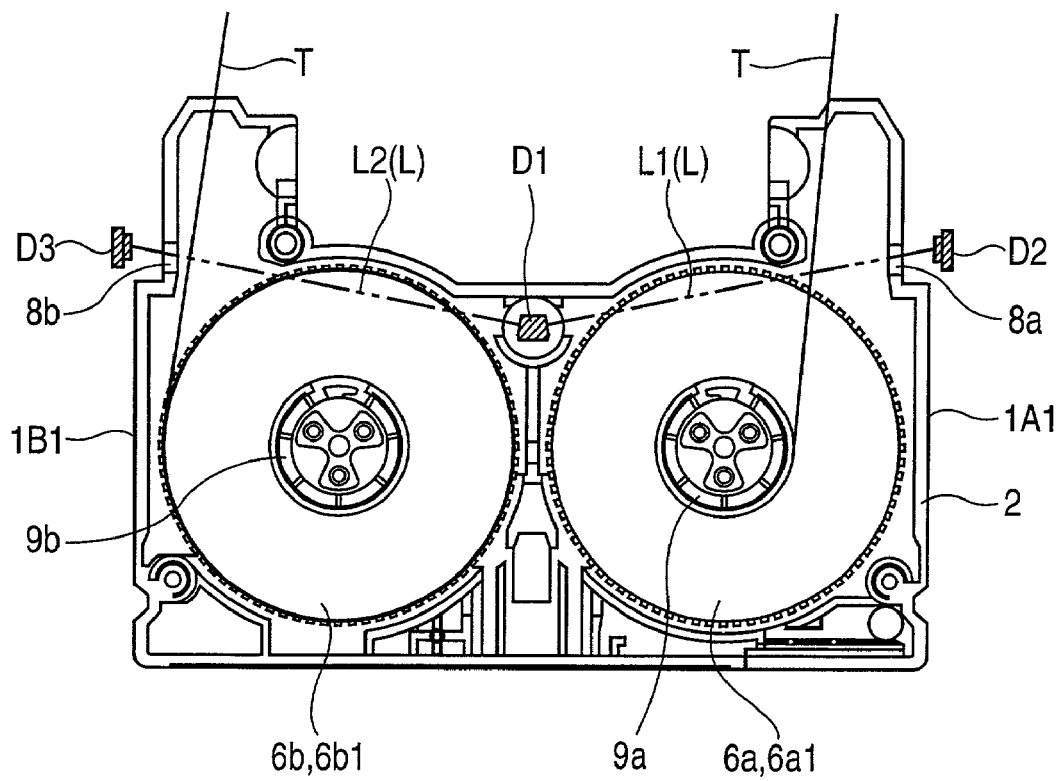
FIG. 3 is a fragmentary cross-sectional view of the conventional tape cassette shown in FIG. 1 for explaining a light path between a light emitting element and a light receiving element inside the tape cassette.
Figure 4:
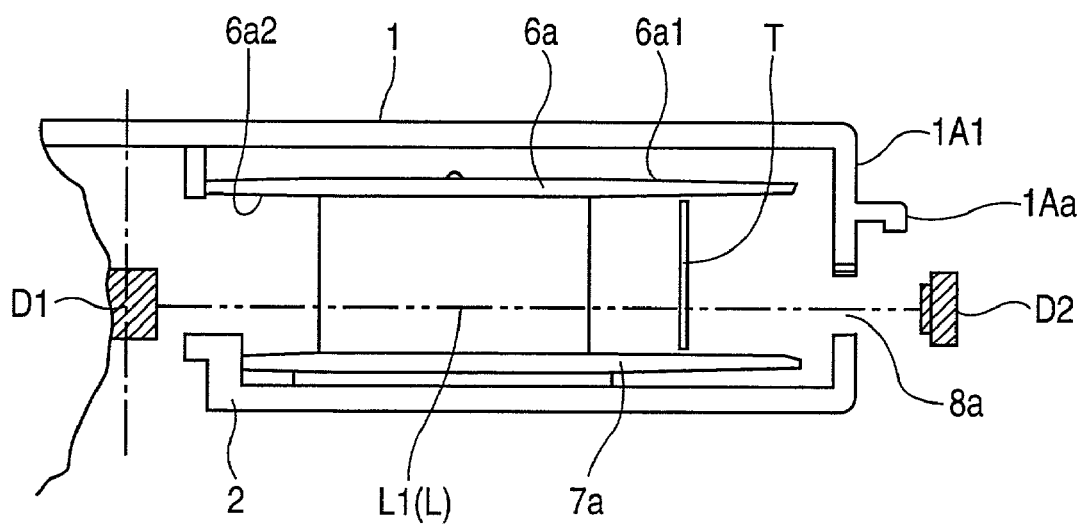
FIG. 4 is a side elevation view in cross section of the conventional tape cassette for explaining the light path between the light emitting element and the light receiving element shown in FIG. 3.

A light emitting element D1 and light receiving elements D2 and D3 are provided in a video tape recorder (hereinafter referred to a VTR) as same manner as shown in FIG. 3 of the prior art. In this configuration, a light path L or detection light beams L1 and L2 detected by respective light receiving elements D2 and D3 are exactly the same as shown in FIG. 3. Further, the light path L or the detection light beams L1 and L2 cross a magnetic tape installed in a tape cassette.

A tape cassette based on the digital video cassette (hereinafter referred to DVC) system is explained hereafter as an example of a tape cassette of the present invention.

[First Embodiment]

Figure 8:
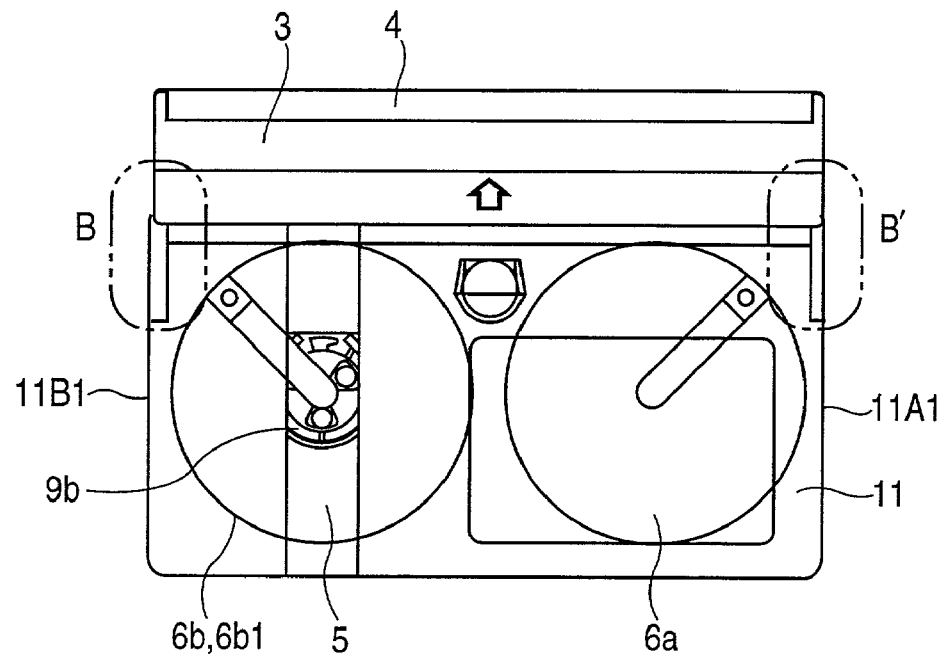
FIG. 8 is a plan view of a tape cassette according to a first embodiment of the present invention.

FIG. 8 is a plan view of a tape cassette according to a first embodiment of the present invention.

Figure 9:
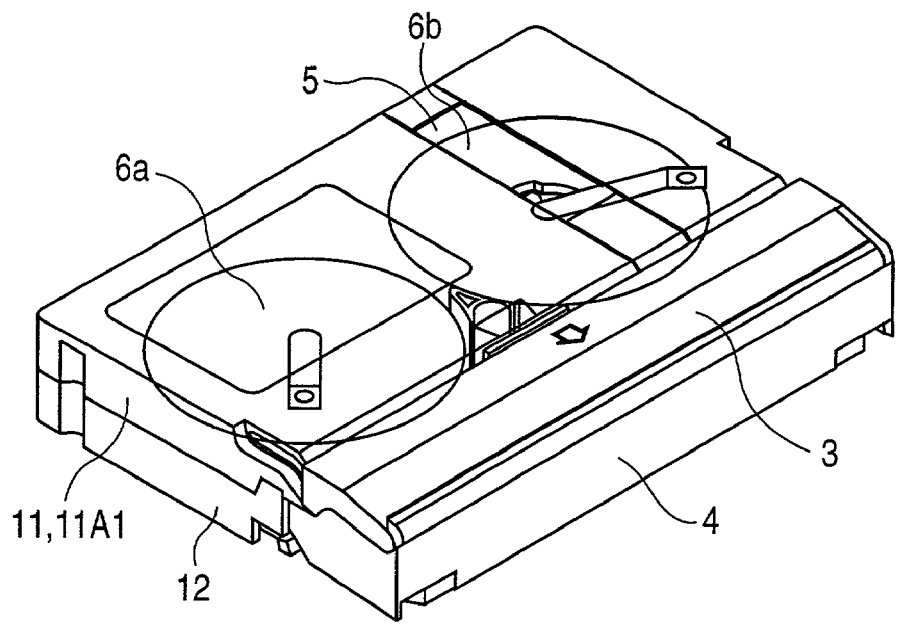
FIG. 9 is a perspective view of the tape cassette shown in FIG. 8.

FIG. 9 is a perspective view of the tape cassette shown in FIG. 8.

Figure 10:
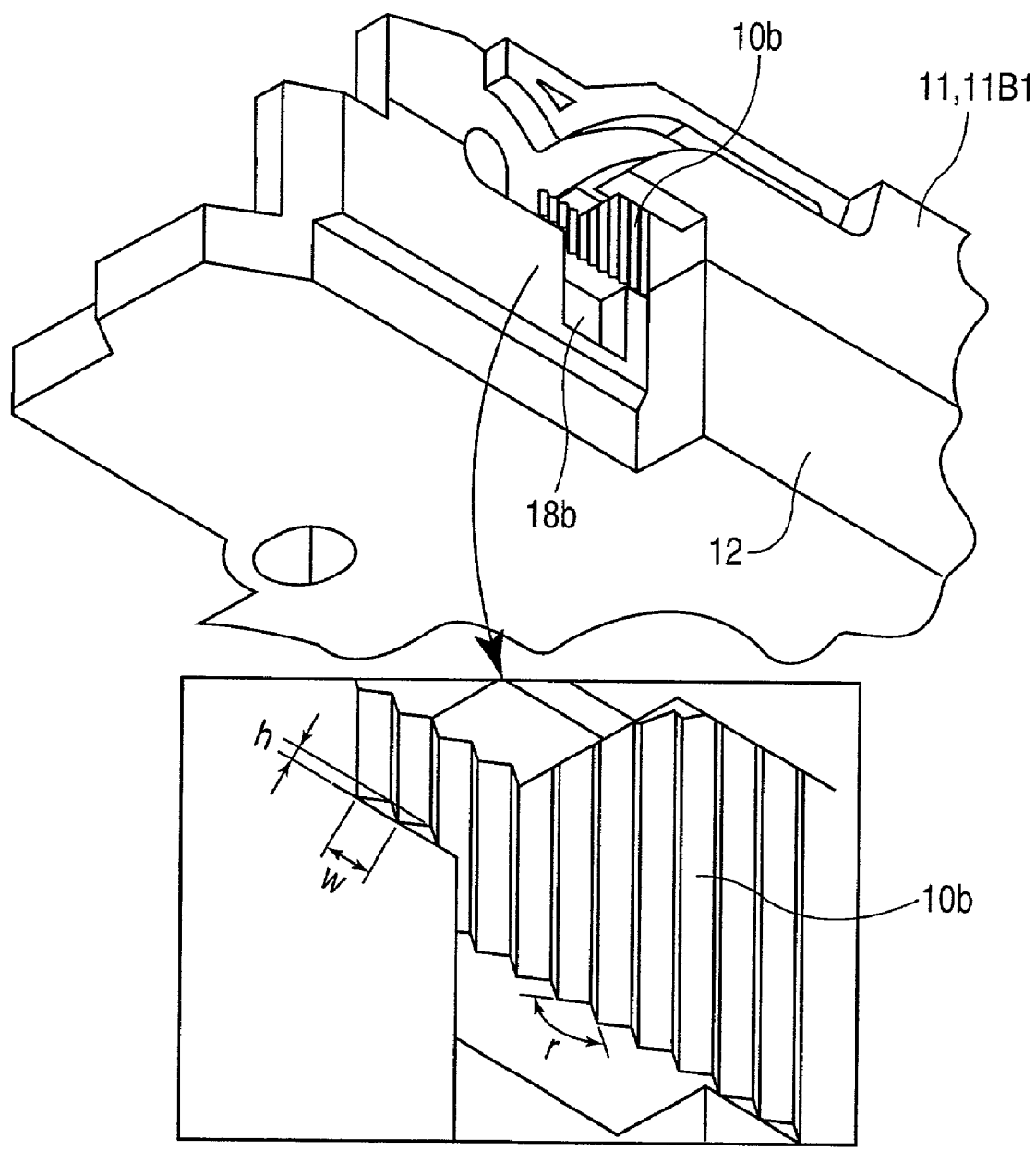
FIG. 10 is a partially enlarged view in perspective of the tape cassette shown in FIG. 8 in a vicinity of a hole for light path.

FIG. 10 is a partially enlarged view in perspective of the tape cassette shown in FIG. 8 in a vicinity of a hole for light path.

Figure 11:
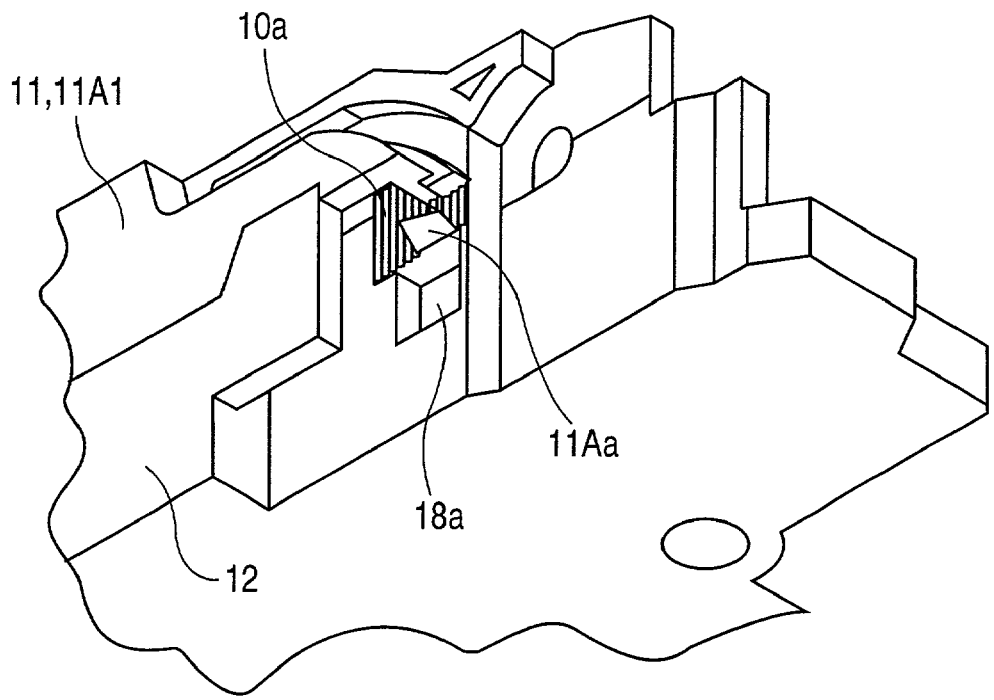
FIG. 11 is a partially enlarged view in perspective of the tape cassette shown in FIG. 8 in a vicinity of another hole for light path.

FIG. 11 is a partially enlarged view in perspective of the tape cassette shown in FIG. 8 in a vicinity of another hole for light path.

Figure 12:
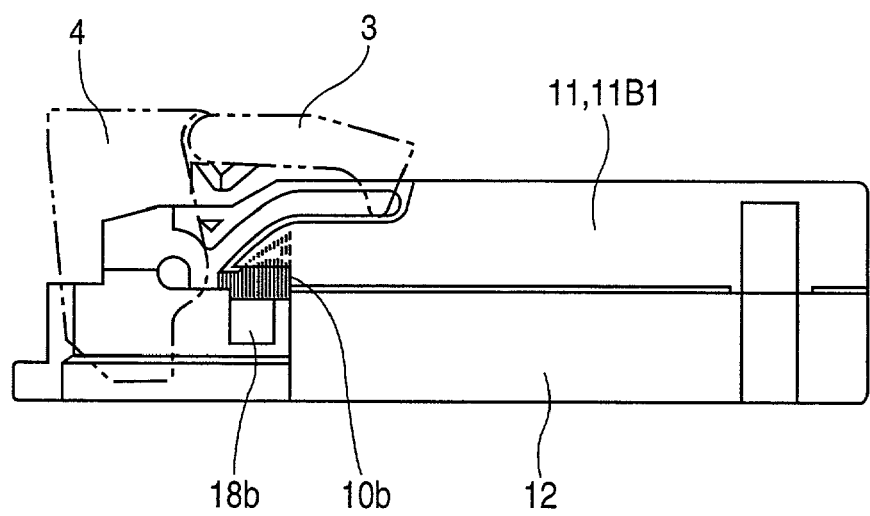
FIG. 12 is a left side view of the tape cassette shown in FIG. 8.

FIG. 12 is a left side view of the tape cassette shown in FIG. 8.

In FIGS. 8 through 12, a tape cassette BB is composed of an upper half 11, a lower half 12, a top lid 3, a front lid 4, a window 5, two upper flanges 6a and 6b, two lower flanges 7a and 7b (not shown), right and left holes 18a and 18b for light path, and two hubs 9a (not shown) and 9b. The upper half 11 is further composed of an outer right side 11A1, an outer left side 11B1, and a protrusion 11Aa. The upper flanges 6a and 6b are formed with top and bottom surfaces respectively, exactly the same configuration as that of the prior art. Furthermore, as shown in FIGS. 10, 11 and 12, there is provided roughened surfaces 10a and 10b on outer walls of the upper half 11 above the right and left holes 18a and 18b. Moreover, in FIG. 8, symbols B and B' represent neighboring areas of the right and left holes 18a and 18b respectively.

The lower half 12 is made by a white opaque material and the upper half 11 is made by a material having high transparency. As shown in FIGS. 10 and 12, the roughened surfaces 10a and 10b are formed on the upper half 11 above the right and left holes 8a and 8b or at a part of the outer right side 11A1 and the outer left side 11B1 respectively through a roughening process by applying a prismatic finish. In consideration of a thickness of a surface to be roughened, that is, a thickness of the upper half 11 between the outer right side 11A1 and the inner right side 11A2 (not shown) or between the outer left side 11B1 and the inner left side 11B2 (not shown) and a light shielding effect, a shape of the prismatic finish is formed as a corrugated shape having a height "h" of approximately 0.15 mm and a width "w" of approximately 0.4 mm with respect to the surface to be roughened or the outer right side 11A1 and the outer left side 11B1. The prismatic shape can be formed by applying the prismatic finish to a mold for forming the upper half 11.

A value of transparency or a ratio of optical transparency of the upper and lower halves 11 and 12 is generally 0% for the lower half 12 and 70 to 85% for the upper half 11 although it depends upon a measuring condition or a wavelength of measuring light and a thickness of the upper and lower halves 11 and 12. The thickness of the upper half 11 between the outer right side 11A1 and the inner right side 11A2 and between the outer left side 11B1 and the inner left side 11B2 is within a range of 0.5 to 1.5 mm. A ridge distance, that is, the width "w" of the roughened surfaces 10a and 10b finished prismatically is dependent on an angle "r", which is regulated by a drafting direction of a mold. In the case of the first embodiment shown in FIG. 10, the drafting direction is vertical. The angle "r" can be arbitrary set by altering a structure of the mold. A light shielding ratio and a light shielding amount of the roughened surface is experimentally confirmed by measuring an output voltage from light reception sensor, that is, the light receiving elements D2 and D3. In a case of the upper half 11 having the roughened surfaces 10a and 10b formed by the prismatic finish, the light shielding amount is improved by 7% with respect to a transparent upper half without roughened surfaces. In a case that the roughened surfaces 10a and 10b are formed by a laser process, which will be mentioned later, the light shielding amount is improved by 18% with respect to a transparent upper half without roughened surfaces.

When an external light beam such as sunlight passing through the upper half 11 having high transparency and a scattered light, which is irradiated from the light emitting element D1 of a VTR and irregularly reflected inside the tape cassette BB, passes through upper half 11 from then inner right side 11A2 to the outer right side 11A1 or from the inner left side 11B2 to the outer left side 11B1 in the vicinity of the right and left holes 18a and 18b, the external light beam and the scattered light is refracted or irregularly reflected by the roughened surfaces 10a and 10b provided above the right and left holes 18a and 18b. As a result of the refraction or the irregular reflection, luminous energy of the scattered light is kept under luminous energy of receivable level at anytime, so that the light receiving elements D2 and D3 can not detect light reception. Therefore, the VTR judges that a magnetic tape T is not in a terminating state of the tape. Accordingly, the VTR keeps the tape running.

As a matter of fact, direct light irradiated from the light emitting element D1 of the VTR passes through the right and left holes 18a and 18b and reaches to the light receiving elements D2 and D3 in a higher luminous energy than a predetermined luminous energy after the direct light transmits through a leader tape section of the magnetic tape T. The VTR judges that the magnetic tape T comes to its end. Accordingly, the VTR stops the tape running.

Figure 5:
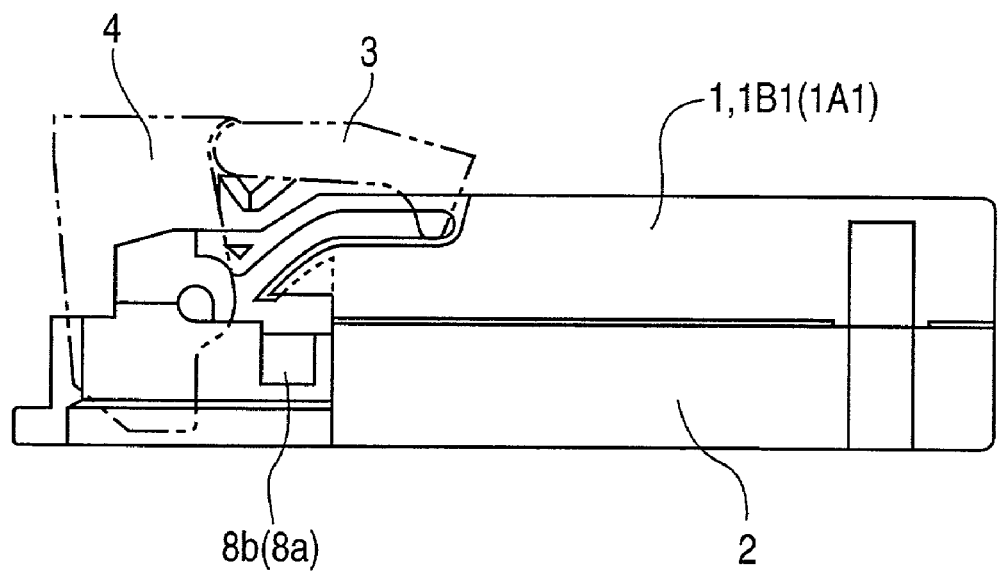
FIG. 5 is a side view of the conventional tape cassette shown in FIG. 1.

On the other hand, the conventional tape cassette AA shown in FIG. 5 is composed of the upper half 1 made by a material of high transparency and the lower half 2 made by a material in black as mentioned above. However, a roughening process is not applied to the surfaces of the outer right and left sides 1A1 and 1B1 above the right and left holes 8a and 8b, which are formed by combining the upper and lower halves 1 and 2. Therefore, an external light beam, which entered into the tape cassette AA through the upper half 1, transmits through an inside of the tape cassette AA and gets out from the tape cassette AA through the upper half 1 once again. A part of the light beam getting out through the upper half 1 passes through the upper half 1 from the inner right side 1A2 to the outer right side 1A1 or from the inner left side 1B2 to the outer left side 1B1.

In a case that the external light beam passed through the upper surfaces of the right and left holes 8a and 8b, that is, through the upper half 1 from the inner right and left sides 1A2 and 1B2 to the outer right and left sides 1A1 and 1B1 gets into the light receiving elements D2 and D3, the light receiving elements D2 and D3 detect light reception if the luminous energy of the external light beam gotten into the light receiving elements D2 and D3 exceeds the predetermined luminous energy level, even though the detection light beams L1 and L2 irradiated from the light emitting element D1 do not reach to the light receiving elements D2 and D3. Thus, the VTR accidentally decides such that the magnetic tape T comes to its end although the magnetic tape T is not in the terminal position of the tape. Accordingly, the VTR may possibly stop its function while the magnetic tape T is still running. In other words, the tape cassette BB of the present invention can solve the problem of the conventional tape cassette AA.

Further, the prismatic finish is depicted in this first embodiment as a roughening process. However, such a roughened surface can be formed by applying a secondary process such as a laser beam processing, painting, and machining after a forming process of a cassette half is completed. A secondary process after a forming process is most desirable for a roughening process in consideration of easiness of providing the roughened surfaces 10a and 10b.

[Second Embodiment]

FIG. 13(a) is a left side view of a tape cassette according to a second embodiment of the present invention.

FIG. 13(b) is a cross sectional view taken substantially along line a—a of FIG. 13(a).

FIG. 14 is a bottom end view of the tape cassette according to the second embodiment of the present invention.

In FIGS. 13(a), 13(b), and 14, a tape cassette CC is composed of an upper half 21 made by a material having high transparency as same as that of the first embodiment, a lower half 22 made by an opaque material, a top lid 3, and a front lid 4. Roughened surfaces 10c1 and 10c2 (hereinafter generically referred to 10c) are formed on an under surface of a protrusion 21Ba, which sticks out from an outer left side 21B1 of the upper half 21 as shown in FIG. 13(b), by a granulating finish as a roughening process. The granulated surface is formed by an electron discharge method such that 10-point average surface roughness Rz becomes 16 µm. Actually, the roughened surface provided with the granulated surface is formed by applying a granulating finish process to a relevant part of a mold for forming an upper half by the electron discharge method in approximately 16 µm of the 10-point average surface roughness Rz. The numerical figure of the Rz is one example. Therefore, the figure of 10-point average surface roughness Rz can be set in consideration of a light shielding effect or an effect of suppressing reflection.

In this second embodiment, it is explained that the roughened surface 10c is formed on the under surface of the protrusion 21Ba above the left hole 28b by applying the roughening process by the granulating finish. However, it is also apparent that a roughened surface 10d (not shown) can be formed on the under surface of another protrusion 21Aa (not shown), which sticks out from an outer right side 21A1 of the upper half 21, by a granulating finish as a roughening process.

An external light beam entering into the upper half 21 from the outside of the tape cassette CC transmits through the inside of the tape cassette CC and gets out from the tape cassette CC through the upper half 21 once again. A part of the external light beam getting out from the tape cassette CC is refracted or irregularly reflected by the roughened surfaces 10d and 10c, which are formed on the under surfaces of the protrusions 21Aa and 21Ba provided on the outer right and left sides 21A1 and 21B1 of the upper half 21. Therefore, luminous energy of scattered light passing through the upper half 21 from the inner right and left sides 21A2 and 21B2 to the outer right and left sides 21A1 and 21B1 is reduced.

As a result of the refraction or the irregular reflection, luminous energy of the scattered light is kept below a receivable level of luminous energy at anytime, so that the light receiving elements D2 and D3 do not detect light reception. Therefore, the VTR judges that a magnetic tape T is not in a terminating state of the tape. Accordingly, the VTR maintains the tape running.

As a matter of fact, a direct light beam irradiated from the light emitting element D1 of the VTR passes through the right and left holes 28a and 28b and reaches to the light receiving elements D2 and D3 in a higher luminous energy level than a predetermined luminous energy level after the direct light beam transmits through a leader tape section of the magnetic tape T. The VTR judges that the magnetic tape T comes to its end. Accordingly, the VTR stops the tape running.

[Third Embodiment]

Figure 15:
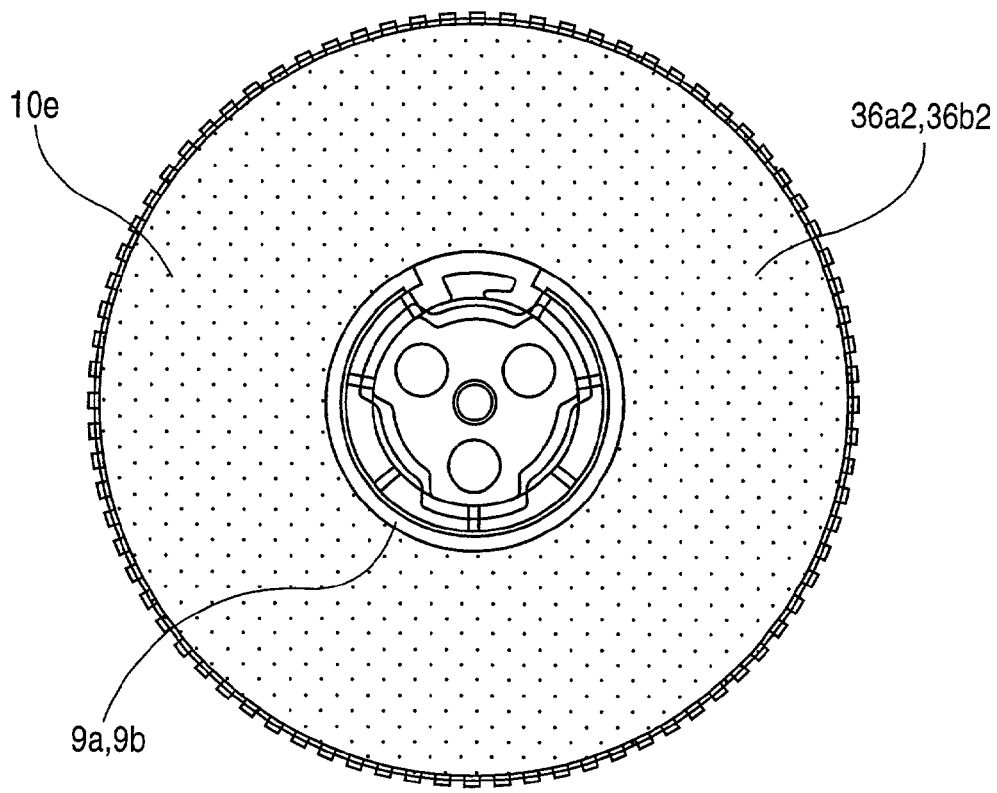
FIG. 15 is a plan view or a bottom end view of an upper flange, which is formed with a roughened surface, being utilized for a tape cassette according to a third embodiment of the present invention.

FIG. 15 is a plan view or a bottom end view of an upper flange, which is formed with a roughened surface, being utilized for a tape cassette according to a third embodiment of the present invention.

In FIG. 15, upper flanges 36a and 36b utilized for a tape cassette according to the third embodiment of the present invention are composed of hubs 9a and 9b for being wrapped around by a magnetic tape T respectively. As shown in FIG. 15, a roughened surface 10e shown by a shaded area is formed throughout a bottom surface 36a2 of the upper flange 36a and a bottom surface 36b2 of the upper flange 36b respectively. The roughened surface 10e can also be formed throughout a top surface 36a1 of the upper flange 36a and a top surface 36b1 of the upper flange 36b.

The roughened surface 10e is formed on the bottom surfaces 36a2 and 36b2 of the upper flanges 36a and 36b or on the top surfaces 36a1 and 36b1 of the upper flanges 36a and 36b by applying the roughening process of the granulating finish after the upper flanges 36a and 36b are formed. By using the upper flanges 36a and 36b having granulated surface being formed by an electron discharge method such that the 10-point average surface roughness Rz becomes 16 μm as mentioned in the second embodiment, the detection light beams L1 and L2, which are refracted or reflected at the bottom surfaces 36a2 and 36b2 of the upper flanges 36a and 36b, can be reduced. Thus, an accidental operation at a tape end can be prevented. Further, luminous energy of an external light beam such as sunlight passing through the upper flanges 36a and 36b can also be reduced by the roughened surface 10e. Accordingly, an accidental operation by the external light beam at a tape end can also be prevented.

With respect to the tape cassette of the third embodiment, any type of tape cassettes such as the tape cassette BB of the first embodiment, the tape cassette CC of the second embodiment, and a tape cassette DD of a fourth embodiment (will be explained next) can be used. By using the upper flanges 36a and 36b, the above-mentioned scattered light transmitted to the light receiving elements D2 and D3 can be drastically reduced. Accordingly, the light receiving elements D2 and D3 can be further prevented from the accidental operation of detecting light reception.

[Fourth Embodiment]

Figure 16:
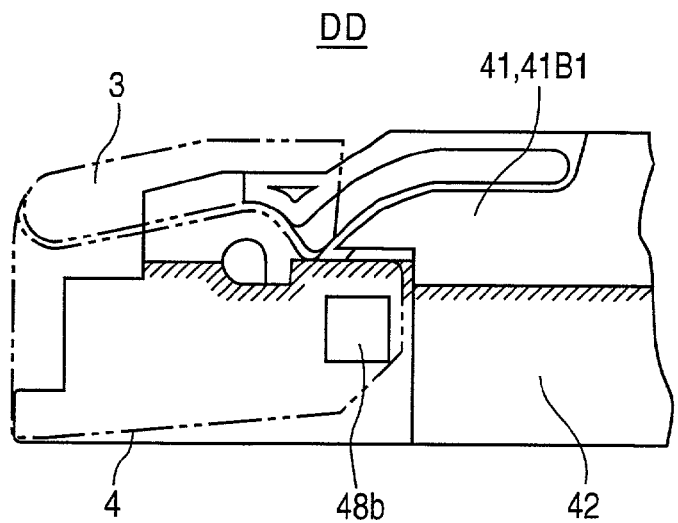
FIG. 16 is a partially enlarged side view of a tape cassette according to a fourth embodiment of the present invention showing a vicinity of a hole for light path.

FIG. 16 is a partially enlarged side view of a tape cassette according to a fourth embodiment of the present invention showing a vicinity of a hole for light path.

In FIG. 16, a tape cassette DD is composed of an upper half 41, a lower half 42, a top lid 3, and a front lid 4. The upper half 41 is made by a material of high transparency and the lower half 42 is made by an opaque material as same manner as those of the first embodiment. Right and left holes 48a (not shown) and 48b are formed by only the lower half 42.

Figure 6:
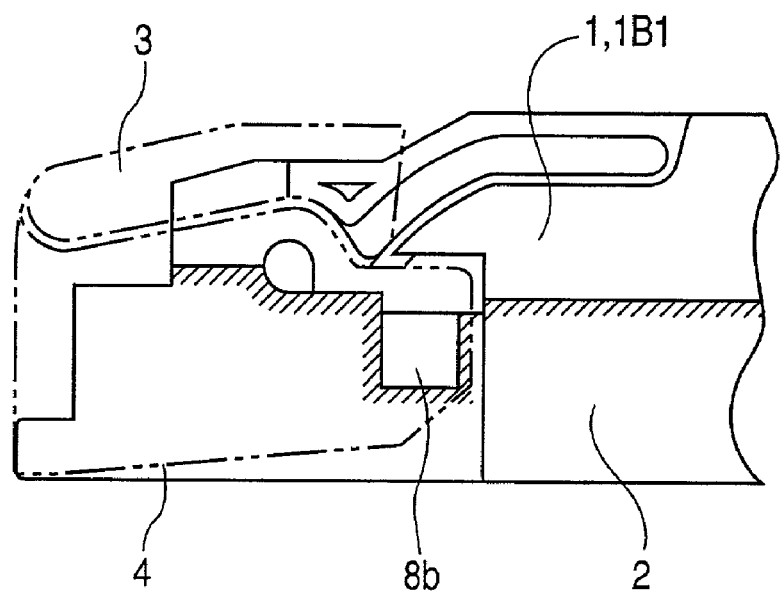
FIG. 6 is a partially enlarged side view of the conventional tape cassette shown in FIG. 1.
Figure 7:
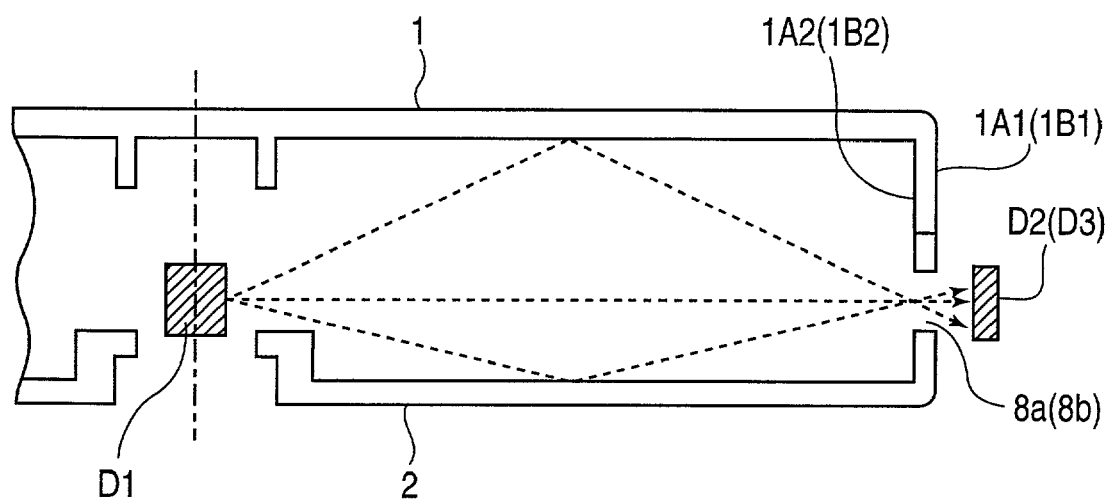
FIG. 7 is a side elevation view partially enlarged in cross section of the conventional tape cassette for exhibiting a state of scattered light beam reaching to the light receiving element as an undesired light beam in the cassette half.

As mentioned above and shown in FIG. 6, the right and left holes 8a and 8b of the conventional tape cassette AA are not formed by only the upper half 1. Since the upper half 1 is made by a material having high transparency and a roughening finish is not applied to the areas above the right and left holes 8a and 8b in the outer right and left sides 1A1 and 1B1, An external light beam, which entered into the tape cassette AA through the upper half 1, passes through an inside of the tape cassette AA and gets out from the tape cassette AA through the upper half 1 once again. A part of the light beam getting out through the upper half 1 passes through from the inner right and left sides 1A2 and 1B2 to the outer right and left sides 1A1 and 1B1. In a case that the external light beam passed through the upper surfaces of the right and left holes 8a and 8b, that is, through the upper half 1 from the inner right and left sides 1A2 and 1B2 to the outer right and left sides 1A1 and 1B1 gets into the light receiving elements D2 and D3, the light receiving elements detect light reception if the luminous energy of the external light beam gotten into the light receiving elements D2 and D3 exceeds the predetermined luminous energy level, even though the detection light beams L1 and L2 irradiated from the light emitting element D1 do not reach to the light receiving elements D2 and D3.

Thus, the VTR accidentally decides such that the magnetic tape T comes to its end although the magnetic tape T is not in the terminal position of the tape. Accordingly, the VTR may possibly stop its function while the magnetic tape T is still running.

In other words, the tape cassette DD of the fourth embodiment can solve the problem caused by the conventional tape cassette AA totally.

In this fourth embodiment, the right and left holes 48a and 48b and their surrounding areas are formed by only the lower half 42 made by an opaque material so as to eliminate an accidental operation of detecting light reception of the light receiving elements D2 and D3. However, it is not limited to the configuration of the right and left holes 48a and 48b, the same effect can be realized by adding a light shielding material to areas above the right and left holes 48a and 48b in the outer right and left sides of the lower half 42. Any methods can be effective as long as the methods can reduce light transmission passing through a surrounding area of the right and left holes 48a and 48b.

[Fifth Embodiment]

Figure 17:
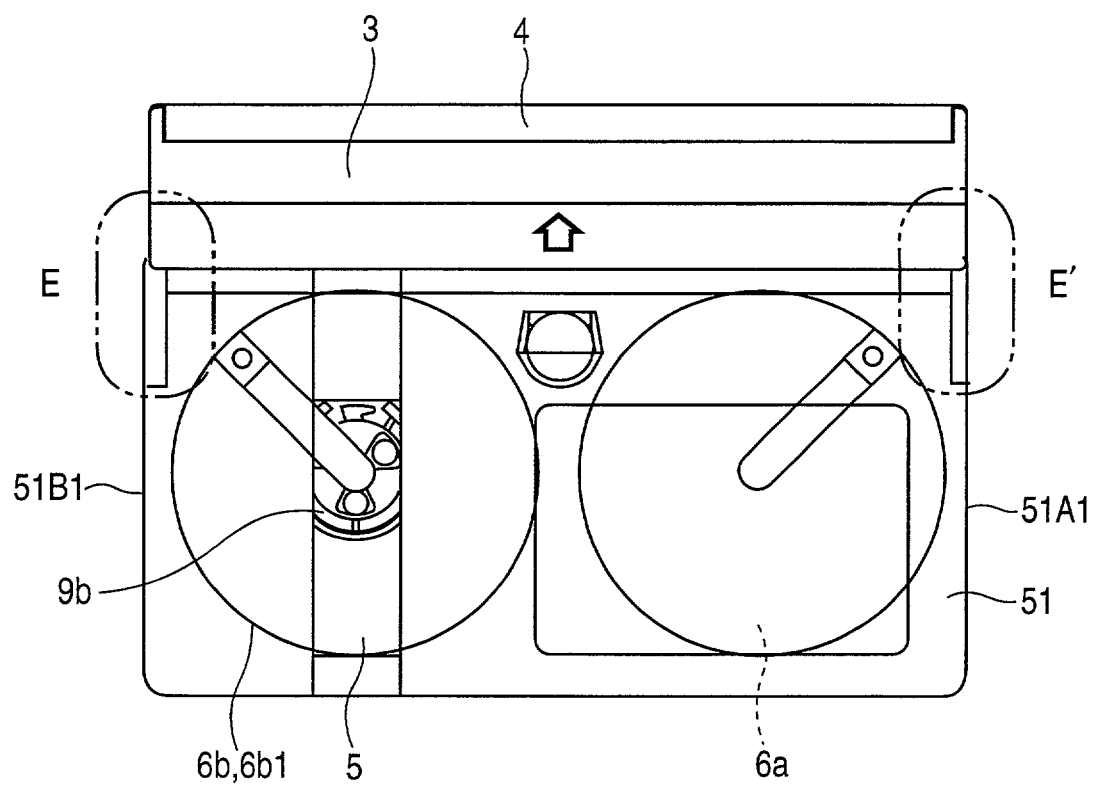
FIG. 17 is a plan view of a tape cassette according to a fifth embodiment of the present invention.

FIG. 17 is a plan view of a tape cassette according to a fifth embodiment of the present invention.

Figure 18A:
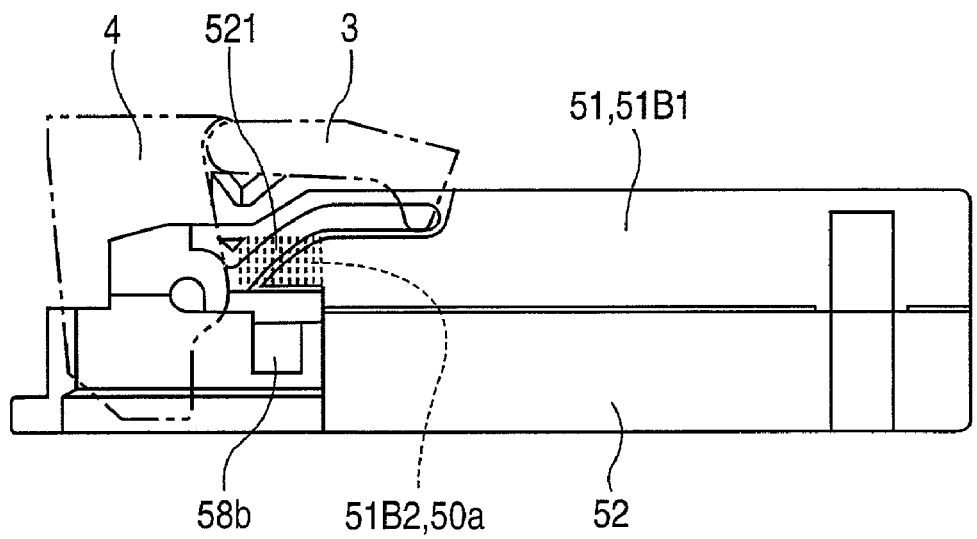
FIG. 18(a) is a left side view of the tape cassette shown in FIG. 17.

FIG. 18(a) is a left side view of the tape cassette shown in FIG. 17.

Figure 18B:
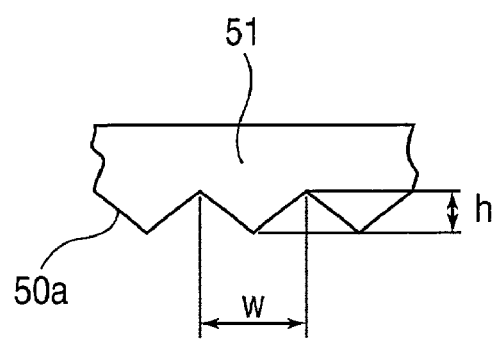
FIG. 18(b) is a partially enlarged view of a prism section provided inside the tape cassette shown in FIG. 18(a).

FIG. 18(b) is a partially enlarged view of a prism section provided inside the tape cassette shown in FIG. 18(a).

Figure 19:
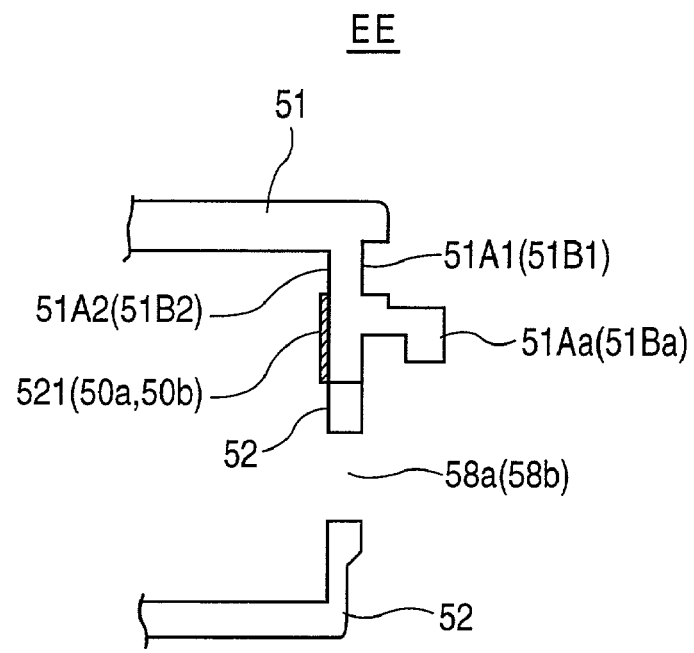
FIG. 19 is a fragmentary cross sectional view of the tape cassette shown in FIG. 17.

FIG. 19 is a fragmentary cross sectional view of the tape cassette shown in FIG. 17.

In FIGS. 17 through 19, a tape cassette EE is composed of an upper half 51, a lower half 52, a top lid 3, a front lid 4, a window 5, two upper flanges 6a and 6b, two lower flanges 7a and 7b (not shown), right and left holes 58a and 58b for light path, and two hubs 9a (not shown) and 9b. The upper half 51 is made by a material having high transparency and further composed of an outer right side 51A1, an outer left side 51B1, an inner right side 51A2, an inner left side 51B2, and protrusions 51Aa and 51Ba. The lower half 52 is made by an opaque material in white color. The upper flange 6a is formed with a top surface 6a1 and a bottom surface 6a2 and the other upper flange 6b is formed with a top surface 6b1 and a bottom surface 6b2 exactly the same as other embodiments except for the third embodiment. Furthermore, as shown in FIGS. 18(a) and 19, there is provided roughened surfaces 50a and 50b on inner walls of the upper half 51, that is the inner right and left sides 51A2 and 51B2 above the right and left holes 58a and 58b. Hereinafter the areas provided with the roughened surfaces 50a and 50b are generically referred to a prism section 521. Moreover, in FIG. 17, symbols E and E' represent neighboring areas of the right and left holes 58a and 58b respectively.

In consideration of a thickness of a wall of which surface is formed with the prism section 521 between the outer right sides 51A1 and the inner right side 51A2 or between the outer left side 51B1 and the inner left side 51B2 and also a light shielding effect, as shown in FIG. 18(b), a configuration of the prism section 521 is such that a height "h" and a width "w" of one prism is approximately 0.15 mm and 0.4 mm respectively. The prismatic finish is formed on a mold for forming the upper half 51.

A value of transparency or a light transmission ratio of the upper and lower halves 51 and 52 are approximately 70 to 85% and 0% respectively although the value is depend upon a measuring conditions such as a wavelength of measuring light beam and a thickness of the wall. The thickness of the wall mentioned above is within a range of 0.5 to 1.5 mm.

Since an external light beam such as sunlight passing through the upper half 51 having high transparency and a scattered light, which is irradiated from the light emitting element D1 of a VTR and irregularly reflected inside the tape cassette EE, is refracted or irregularly reflected by the prism section 521 provided on the inside walls, that is, the inner right and left sides 51A2 and 51B2 of the upper half 51 allocated above the right and left holes 58a and 58b, such an external light beam and scattered light can hardly transmit through the upper half 51 from the inner right and left sides 51A2 and 51B2 to the outer right and left sides 51A1 and 51B1 toward the outside of the tape cassette EE.

As a result of the refraction or the irregular reflection by the prism section 521, luminous energy of light passing through the upper half 51 from the inner right and left sides 51A2 and 51B2 to the outer right and left sides 51A1 and 51B1 is kept below the receivable level of luminous energy at anytime, so that the light receiving elements D2 and D3 can not detect light reception. Therefore, the VTR judges that a magnetic tape T is not in a terminating state of the tape. Accordingly, the VTR keeps the tape running.

As a matter of fact, a direct light beam irradiated from the light emitting element D1 of the VTR passes through the right and left holes 58a and 58b and reaches to the light receiving elements D2 and D3 in a higher luminous energy level than the predetermined luminous energy level after the direct light beam transmits through a leader tape section of the magnetic tape T. The VTR judges that the magnetic tape T comes to its end. Accordingly, the VTR stops the tape running.

On the other hand, the conventional tape cassette AA shown in FIG. 5 is composed of the upper half 1 made by a material having high transparency and the lower half 2 made by a material in black as mentioned above. However, a roughening process is not applied to the surfaces of the inner right and left sides 1A2 and 1B2 above the right and left holes 8a and 8b, which are formed by combining the upper and lower halves 1 and 2. In other words, a prism section is not formed on the surface of the inner side or the outer side of the upper half 1. Therefore, there is existed a problem such that an external light beam, which entered into the conventional tape cassette AA through the upper half 1, passes through an inside of the tape cassette AA and gets out from the tape cassette AA through the upper half 1 once again, wherein a part of the light beam getting out through the upper half 1 passes through the upper half 1 from the inner right and left sides 1A2 and 1B2 to the outer right and left sides 1A1 and 1B1.

As a result, in a case that the external light beam passing through the upper half 1 from the inner right and left sides 1A2 and 1B2 to the outer right and left sides 1A1 and 1B1 gets into the light receiving elements D2 and D3, the light receiving elements D2 and D3 detect light reception if the luminous energy of the external light beam gotten into the light receiving elements D2 and D3 exceeds the predetermined luminous energy level, even though the detection light beams L1 and L2 irradiated from the light emitting element D1 do not reach to the light receiving elements D2 and D3. Thus, the VTR accidentally decides such that the magnetic tape T comes to its end although the magnetic tape T is not in the terminal position of the tape. Accordingly, the VTR may possibly stop its function while the magnetic tape T is still running. In other words, the tape cassette EE of the present invention can solve the problem of the conventional tape cassette AA.

Figure 22:
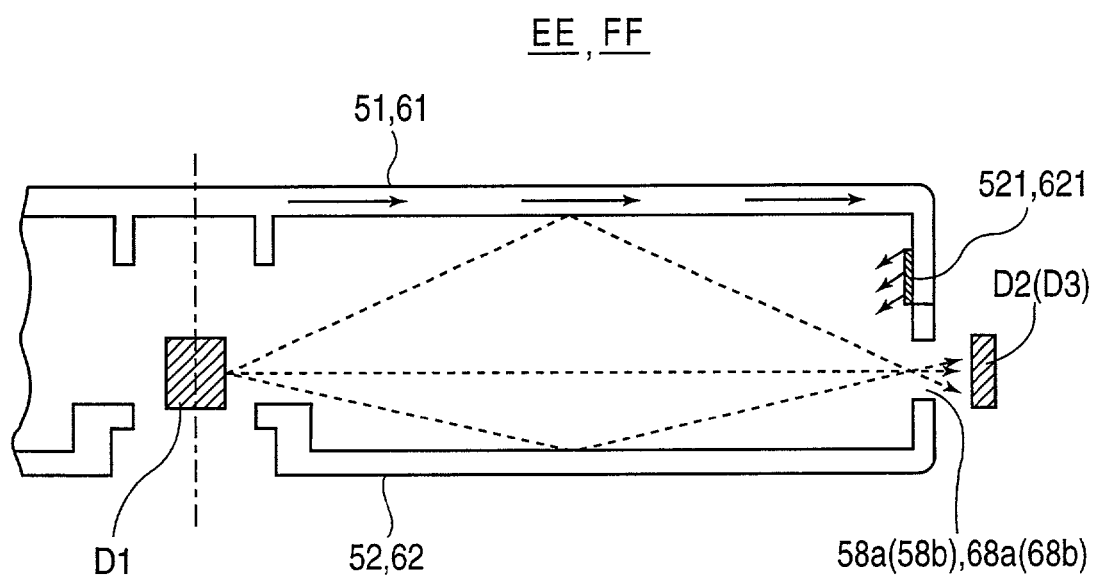
FIG. 22 is a cross sectional view of the tape cassette according to the fifth and sixth embodiments with showing that undesired light traveling through a cassette half is irradiated at the prism section shown in FIGS. 18(a) and 20.

Although the tape cassette EE is composed of the upper half 51 made by a material having high transparency exactly the same configuration as the conventional tape cassette AA, undesired light, which travels through the transparent material of the upper half and is irradiated to the outside, is irradiated toward the inside of the tape cassette EE by the prism section 521 formed on the surfaces of the inner right and left sides 51A2 and 51B2 as shown in FIG. 22. Accordingly, the VTR is prevented from accidental operation caused by misjudging of a tape end of magnetic tape.

[Sixth Embodiment]

Figure 20:
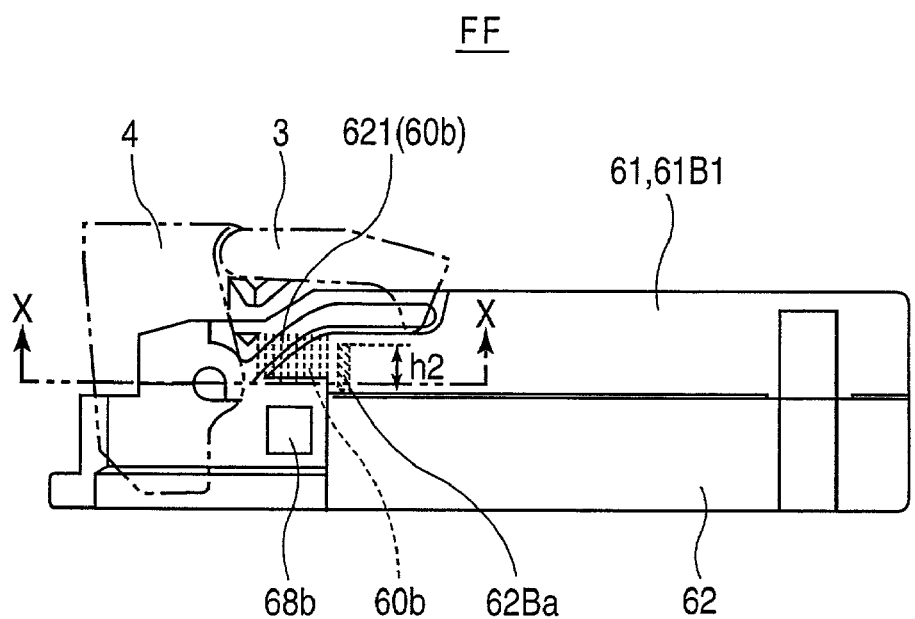
FIG. 20 is a left side view of a tape cassette according to a sixth embodiment of the present invention.

FIG. 20 is a left side view of a tape cassette according to a sixth embodiment of the present invention.

Figure 21:
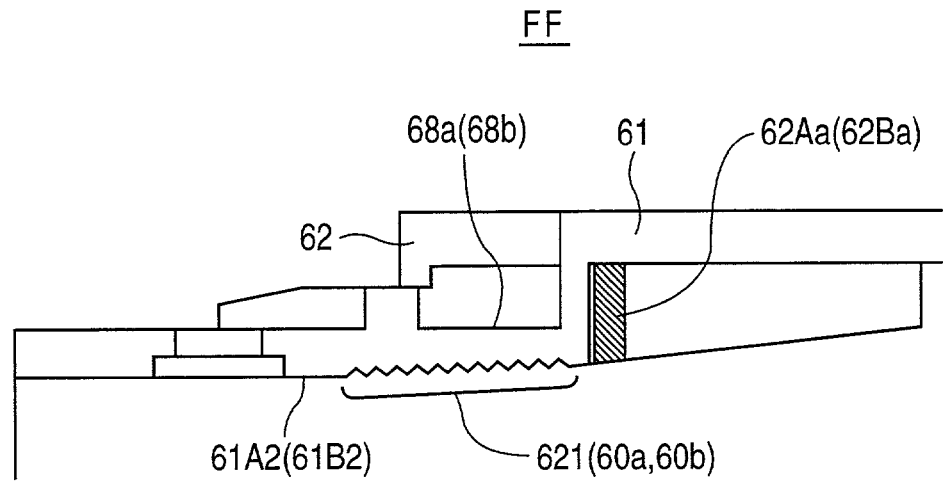
FIG. 21 is a fragmentary cross sectional view of the tape cassette partially enlarged according to the sixth embodiment of the present invention.

FIG. 21 is a fragmentary cross sectional view of the tape cassette partially enlarged taken substantially along line X—X of FIG. 20.

In FIGS. 20 and 21, a tape cassette FF is composed of an upper half 61, a lower half 62, a top lid 3, a front lid 4, and right and left holes 68a and 68b for light path. The upper half 61 is made by a material having high transparency and further composed of an outer right side 61A1 (not shown), an outer left side 61B1, an inner right side 61A2, and an inner left side 61B2. The lower half 62 is made by an opaque material and further composed of protrusions 62Aa and 62Ba provided on an inner wall of the lower half 62. Furthermore, as shown in FIGS. 20 and 21, there is provided roughened surfaces 60a and 60b on inner walls of the upper half 61, that is, the inner right and left sides 61A2 and 61B2 above the right and left holes 68a and 68b respectively. Hereinafter the areas provided with the roughened surfaces 60a and 60b are generically referred to a prism section 621. In this sixth embodiment, a height h2 of the protrusions 62Aa and 62Ba is 3.1 mm, for example. In order to obtain preferable light shielding ability, the height h2 is desirable within a range of 2.5 to 3.1 mm. A position of forming the protrusions 62Aa and 62Ba is preferably opposite side to the front lid 4 with respect to the right and left holes 68a and 68b in consideration of the dimensions of the tape cassette FF.

Providing the protrusions 62Aa and 62Ba reduces luminous energy of scattered light passing through the transparent section of the upper half 61 in the vicinity of the prism section 621.

As a result of the refraction or the irregular reflection, luminous energy of the scattered light is kept below the receivable level of luminous energy at anytime, so that the light receiving elements D2 and D3 can not detect light reception. Therefore, the VTR judges that a magnetic tape T is not in a terminating state of the tape. Accordingly, the VTR keeps the tape running.

As a matter of fact, a direct light beam irradiated from the light emitting element D1 of the VTR passes through the right and left holes 68a and 68b and reaches to the light receiving elements D2 and D3 in a higher luminous energy level than the predetermined luminous energy level after the direct light beam transmits through a leader tape section of the magnetic tape T. The VTR judges that the magnetic tape T comes to its end. Accordingly, the VTR stops the tape running.

Further, the protrusions 62Aa and 62Ba are formed inside the lower half 62 so as to be covered by the upper half 61. Therefore, the protrusions 62Aa and 62Ba are hardly noticeable if the tape cassette FF is observed from its side. Accordingly, the appearance of the tape cassette FF is excellent in design.

FIG. 22 is a cross sectional view of the tape cassette according to the fifth and sixth embodiments with showing that undesired light traveling through the upper half is irradiated at the prism section shown in FIGS. 18(a) and 20.

In FIG. 22, undesired light, which penetrates through the transparent material of the upper half 51 or 61 of the tape cassette EE or FF, is refracted or irregularly reflected by the prism section 521 or 621 and is emitted into the internal space of the tape cassette EE or FF. Therefore, the undesired light hardly reaches to the light receiving elements D2 and D3 through the right and left holes 58a and 58b or 68a and 68b for light path. Accordingly, more accurate detection of light reception can be assured.

While the invention has been described above with reference to specific embodiments thereof, it is apparent that many changes, modifications and variations in the arrangement of equipment and devices and in materials can be made without departing from the invention concept disclosed herein. For example, the roughened surfaces 10a and 10b of the first embodiment are provided on the outer surfaces above the right and left holes 18a and 18b. However, the same effect of reducing light transmission can be obtained by applying a roughening finish on the surrounding areas of the outer surfaces of the right and left holes 18a and 18b as long as a transparent material is utilized. Further, in the first embodiment, the roughening finish is applied to the outer surfaces 11A1 and 11B1 of the upper half 11. However, it is apparent that the roughening finish can be applied to not only the outer surfaces 11A1 and 11B1 of the upper half 11 but also the outer surfaces of the lower half 12, or that the roughening finish can be applied only to the outer surfaces of the lower half 12. Furthermore, in the fifth embodiment, the roughening finish can be applied to the inner surfaces of the surrounding areas of the right and left holes 58a and 58b made by a transparent material although the fifth embodiment discloses that the roughening finish is provided on the inner surfaces of the upper half 51 above the right and left holes 58a and 58b. With respect to a material of the lower half, the preferred embodiments disclose that the lower half is made by a white opaque material. However, the color and material of the lower half is not limited to the white opaque material. A material in lower optical transparency as low as scattered light passing through the lower half from the inside of the tape cassette is not detected by the light receiving elements D2 and D3, or a material in higher optical transparency can be utilized. In a case of utilizing a material in higher optical transparency for the lower half, applying a roughening finish to the external surfaces of the surrounding areas of the right and left holes for light path is effective for reducing scattered light, which reaches the light receiving elements D2 and D3. In addition thereto, the tape cassette disclosed in the preferred embodiments is explained as a tape cassette based on the DVC (digital video cassette) system. However, the tape cassette of the present invention can be applied to any type of tape cassettes such as a tape cassette of the VHS system other than the DVC system.

According to an aspect of the present invention, there provided a tape cassette, which can prevent an apparatus for tape driving from error detection of a tape end of magnetic tape. The tape cassette is composed of holes for light path, which are provided on side surfaces of an upper half having higher optical transparency and side surfaces of a lower half in order to transmit detection light irradiated by a light emitting section of the apparatus to a light receiving section of the apparatus. By applying a roughening finish to outer surfaces of the upper half adjacent to the holes for light path and/or outer surfaces of the lower half can prevent undesired light other than a detection light beam of more than a detectable luminous energy level from reaching to the light receiving section.

According to another aspect of the present invention, there provided a tape cassette, which can prevent an apparatus for tape driving from error detection of a tape end of magnetic tape. The tape cassette is provided with holes for light path, which are provided on side surfaces of an upper half made by at least a material having higher optical transparency in order to transmit a detection light beam irradiated by a light emitting section of the apparatus to a light receiving section of the apparatus. Further, applying a roughening finish to inner surfaces of the upper half adjacent to the holes for light path can prevent undesired light other than the detection light beam of more than the detectable luminous energy level from reaching to the light receiving section. Furthermore, the effect of preventing undesired light is more increased by forming a protrusion provided on a lower half in a vicinity of the holes for light path.

What is claimed is:

1. A tape cassette comprising:
an upper half and a lower half combined with each other,
wherein said tape cassette is utilized for an apparatus that is provided with a light emitting section for detecting a tape end of a magnetic tape,
and a light receiving section for detecting the tape end of the magnetic tape by receiving a detection light beam irradiated by said light emitting section wherein the detection light beam irradiated by said light emitting section reaches said light receiving section at a level of luminous energy exceeding a predetermined luminous energy level,
said tape cassette is further characterized in that
at least said upper half is made of a material having optical transparency, and
that a hole for a light path is formed on both sides of said tape cassette composed of said upper and lower halves so as to pass the detection light beam irradiated by said light emitting section to said light receiving section, and
that a protrusion is formed on an outer side of said upper half above of said hole for a light path, wherein said protrusion scatters the detection light beam irradiated by said light emitting section and passes through said upper half from a surface confronting said lower half and a surface perpendicular to the outer side of said upper half out of a plurality of surfaces forming said protrusion, and
wherein said surface confronting with said lower half and a said surface perpendicular to the outer side of said upper half is roughened so as to scatter said detection light beam.

* * * * *